United States Patent
Treharne et al.

(10) Patent No.: US 7,699,129 B2
(45) Date of Patent: Apr. 20, 2010

(54) METHOD AND SYSTEM FOR ALERTING A DRIVER THAT A MOTIVE POWER SYSTEM IS ABOUT TO BE ACTIVATED

(75) Inventors: William David Treharne, Ypsilanti Township, MI (US); Michael Paul Lindlbauer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 11/931,366

(22) Filed: Oct. 31, 2007

(65) Prior Publication Data

US 2009/0112382 A1 Apr. 30, 2009

(51) Int. Cl.
*B60W 10/00* (2006.01)
(52) U.S. Cl. .............. 180/65.265; 903/904; 701/22; 701/70
(58) Field of Classification Search ............ 180/65.265, 180/65.27, 65.275; 903/904, 930; 701/1, 701/22, 70, 99
See application file for complete search history.

(56) References Cited

U.S. PATENT DOCUMENTS

| | | | |
|---|---|---|---|
| 5,113,721 A | 5/1992 | Polly | |
| 5,166,879 A | 11/1992 | Greene et al. | |
| 5,897,437 A | 4/1999 | Nishiumi et al. | |
| 6,092,021 A | 7/2000 | Ehlbeck et al. | |
| 6,164,400 A | 12/2000 | Jankovic et al. | |
| 6,289,332 B2 | 9/2001 | Menig et al. | |
| 6,295,500 B1 | 9/2001 | Cullen et al. | |
| 6,470,256 B1 | 10/2002 | Cikalo et al. | |
| 6,693,622 B1 | 2/2004 | Shahoian et al. | |
| 6,708,099 B2 | 3/2004 | Tellis et al. | |
| 6,795,755 B2 | 9/2004 | Keilhofer et al. | |
| 6,827,167 B2 | 12/2004 | Cikanek et al. | |
| 6,925,425 B2 | 8/2005 | Remboski et al. | |

(Continued)

FOREIGN PATENT DOCUMENTS

DE 10218012 A1 11/2003

(Continued)

OTHER PUBLICATIONS

Max Glaskin, Vibrating Pedal Says 'Ease Off Gas', http://www.newscientist.com/article.ns?id=dn4787, Mar. 22, 2004, pp. 1-3.
Edmunds.com, Driving Tips, We Test the Tips—What Really Saves Gas? And How Much?, http://www.edmunds.com/ownership/driving/articles/106842/article.html, Nov. 22, 2005, pp. 1-5.

(Continued)

*Primary Examiner*—Paul N Dickson
*Assistant Examiner*—John D Walters
(74) *Attorney, Agent, or Firm*—David B. Kelley; Brooks Kushman P.C.

(57) ABSTRACT

An accelerator pedal provides feedback to a driver of a vehicle indicating that an engine is about to be started. This feedback is associated with a threshold position of the accelerator pedal. The threshold position may be fixed and a pedal mapping curve fit to pass through the threshold position. The threshold position may vary and depend on a minimum of the motive power capacity of a battery and an activation power threshold of the engine.

20 Claims, 5 Drawing Sheets

U.S. PATENT DOCUMENTS

| | | |
|---|---|---|
| 7,016,803 B2 | 3/2006 | Kitazawa |
| 7,021,409 B2 | 4/2006 | Tamor |
| 7,237,453 B2 * | 7/2007 | Kohlen et al. .................. 74/513 |
| 7,480,562 B2 * | 1/2009 | Kustosch .................... 701/205 |
| 2004/0249533 A1 | 12/2004 | Wheals et al. |
| 2004/0259687 A1 * | 12/2004 | Ritter et al. ................. 477/187 |
| 2005/0021226 A1 | 1/2005 | Kustosch |
| 2005/0101433 A1 | 5/2005 | Joe |
| 2005/0110348 A1 | 5/2005 | Hijikata et al. |
| 2005/0115751 A1 | 6/2005 | Yamaguchi et al. |
| 2005/0145058 A1 | 7/2005 | Kohlen et al. |
| 2006/0231074 A1 | 10/2006 | Ueno et al. |
| 2009/0096597 A1 * | 4/2009 | Avery et al. ................. 340/435 |

FOREIGN PATENT DOCUMENTS

| | | |
|---|---|---|
| FR | 2828155 A1 | 2/2003 |
| JP | 2002370560 | 12/2002 |
| JP | 2003335151 | 11/2003 |
| JP | 2003343305 | 12/2003 |

OTHER PUBLICATIONS

Shell.com online article, Top tips for fuel efficient driving, http://www.shell.com/home/Framework?siteid=media-en&FC2=/media-en/html/iwgen/feature_stories/2006/zzz_lhn.html&FC3=media-en/html/iwgen/feature_stories/2006/fuel_efficiency_tips_17012006.html, Apr. 24, 2006, pp. 1-3.

A Low Cost OBD2 All-In-One Scan Tool - $99.95, http://www.obd2allinone.com/, pp. 1-8, May 4, 2006.

Chan et al, Symbiotic Car: Haptic Feedback Accelerator Pedal, http://wikibox.stanford.edu/docushare2003/dsweb/ Get/Document-7280/VW03-04.pdf, Stanford University, pp. 1-2, 2004.

Eco-Driving online module, Driving Skills, http://www.drivingskillsforlife.com/content/view/3/14/lang.en, Ford Motor Company and the Governor's Highway Safety Association, pp. 1-9, printed May 22, 2006.

1975 AMC Pacer Home Page, http://faculty.concord.edu/chrisz/hobby/75-Pacer-1.html, 1-16, printed Oct. 29, 2007.

\* cited by examiner

METHOD AND SYSTEM FOR ALERTING A DRIVER THAT A MOTIVE POWER SYSTEM IS ABOUT TO BE ACTIVATED

BACKGROUND

1. Field of the Invention

The invention relates to methods and systems for alerting a driver that a motive power system is about to be activated.

2. Discussion

Hybrid electric vehicles have a traction battery and an engine, which may be an internal combustion engine or a hydrogen fuel cell. The traction battery and engine provide power to move the vehicle. In some circumstances, the traction battery is the primary motive power source for the vehicle. For example, the traction battery may exclusively provide power to support low to moderate speed driving. In other circumstances, power from the traction battery may be supplemented with power from the engine if the driver demand for power exceeds the capacity of the traction battery. For example, the traction battery and engine may provide power to support high speed driving.

A driver of a hybrid electric vehicle may wish to drive in electric only mode. The driver, however, may be unaware that requests for additional power will result in the starting of an engine.

SUMMARY

Embodiments of the invention may take the form of a method for alerting a driver that a motive power source is about to be activated. The vehicle includes a motive power source and an accelerator pedal having a threshold position. The method includes determining whether the motive power source is active and providing tactile feedback to the driver via the accelerator pedal if the motive power source is inactive and the accelerator pedal is about to exceed the threshold pedal position.

Embodiments of the invention may take the form of a system for alerting a driver of a vehicle that a motive power source is about to be activated. The vehicle includes first and second motive power sources. The system includes an accelerator pedal having a threshold pedal position beyond which the second motive power source will be activated. The system also includes at least one controller configured to determine whether the second motive power source is active. The at least one controller is further configured to provide tactile feedback via the accelerator pedal if the second motive power source is inactive and the accelerator pedal is about to exceed the threshold pedal position.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

An accelerator pedal may provide an effort bump, e.g., an increased pedal force, during pedal travel. The effort bump indicates the limit of the battery propulsion power available. The powertrain control system may provide battery propulsion for pedal travel prior to the effort bump. This battery propulsion, however, may be susceptible to override from conditions such as battery low state of charge and low engine temperature. The powertrain control system may provide engine propulsion in combination with battery propulsion for pedal travel above the effort bump.

Accelerator pedal effort may be fixed or variable via, for example, electronic feedback. If fixed, the pedal effort may be the same or different before and after the effort bump. If variable, the effort and offset of the pedal effort versus pedal rotation may be programmable. Additionally, the effort bump feature may be driver selectable, e.g., electronically enabled/disabled.

Figure 1:
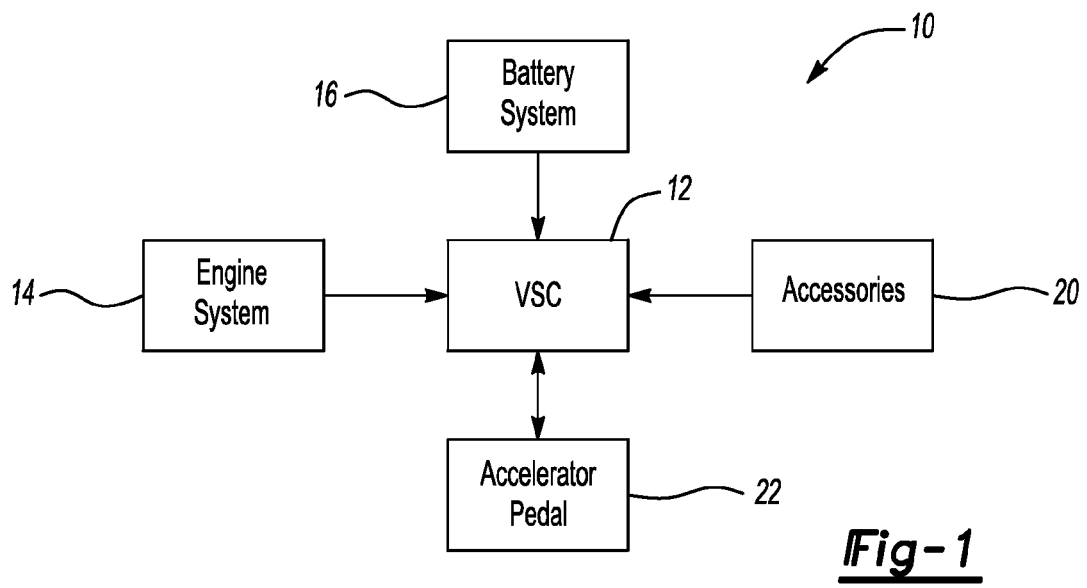
FIG. 1 is a block diagram of a portion of an exemplary vehicle control system in accordance with certain embodiments of the invention.

FIG. 1 is a block diagram of a portion of an exemplary vehicle control system 10. A vehicle system controller (VSC) 12 reads the on/off status of an engine system 14, the state of charge and discharge limit of a battery system 16, and the accessory load associated with vehicle accessories 20, e.g., an air conditioning inverter, etc. In other embodiments, an ultra capacitor or other electrical storage device may be used instead of the battery system 16. Similarly, in other embodiments, a fuel cell or other power system may be used instead of the engine system 14. The VSC 12 may communicate with the engine system 14, battery system 16, and vehicle accessories 20 via a controller area network (CAN) or other suitable communication link. As described below, the VSC 12 uses this information to provide tactile feedback, e.g., increased pedal effort, vibration, etc., to a driver.

Figure 2:
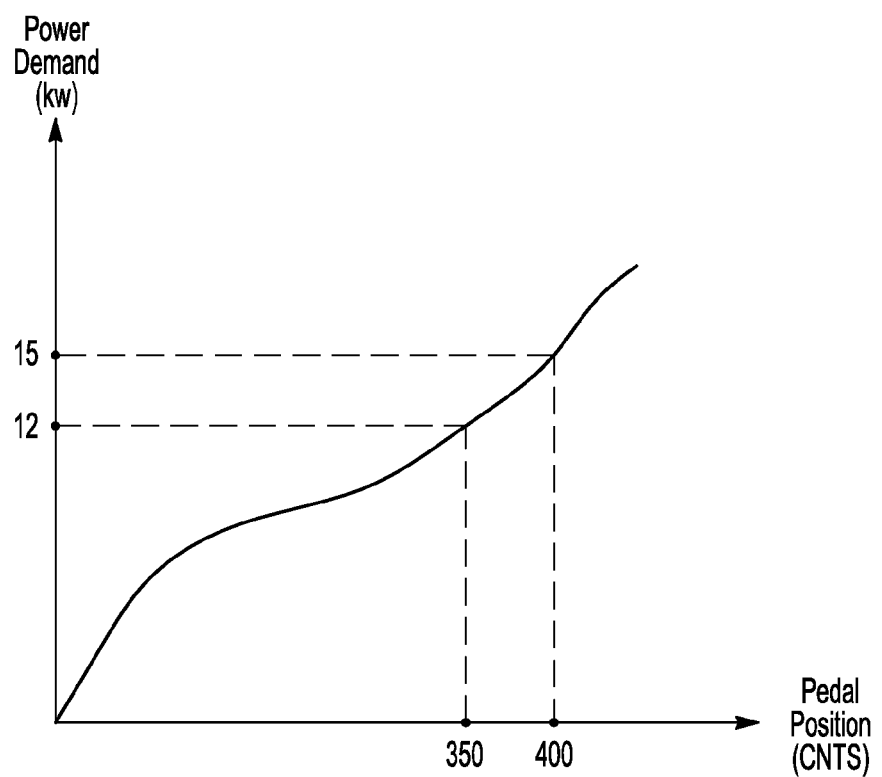
FIG. 2 is an exemplary plot of driver demanded power versus accelerator pedal position for the accelerator pedal of FIG. 1.

FIG. 2 is an exemplary plot of driver demanded power versus accelerator pedal position. As accelerator pedal position increases, driver demanded power generally increases. This information may be stored in a look-up table, for example, in memory associated with the VSC 12. This information may also be stored in memory remote from the VSC 12 and accessed, for example, via CAN.

The information read by the VSC 12 may be used in combination with the information plotted in FIG. 2 to determine the pedal position beyond which power from the engine system 14 may be required to support driver demands for power. The limit of motive power available from the battery system 16 may be found by taking the difference between the discharge limit of the battery and any accessory loads:

Discharge Limit−Accessory Load=Electric Only Limit

In some circumstances, this limit may be used to determine a tactile position for the accelerator pedal 22. In one example, the discharge limit of the battery system 16 is 20 kw and the accessory load from the accessories 20 is 5 kw. This yields a 15 kw electric only limit for the battery system 16. A driver demand for power above 15 kw will necessitate the starting of the engine system 14.

As may be seen in FIG. 2, a driver demand for power of 15 kw corresponds to an accelerator pedal position of 400 counts. As described below, the pedal effort may be increased around 350-400 counts to alert the driver that the engine system 14 is about to be started.

In other circumstances, it may be more efficient to provide motive power from the engine system 14 prior to the electric only limit of the battery system 16. For example, vehicle testing, simulation and/or analysis may reveal that it is more efficient to provide power from the engine system 14 for driver demands for power exceeding 12 kw even if the electric only limit of the battery system 16 is greater than 12 kw. Such simulation and/or analysis may be based on the chemistry of the battery, battery temperature, electrical path efficiency of the vehicle power system, as well as other factors.

As may be seen in FIG. 2, a driver demand for power of 12 kw corresponds to an accelerator pedal position of 350 counts. As described below, the pedal effort may be increased around 350 counts to alert the driver that the engine system 14 is about to be started.

Parameters affecting battery efficiency may be used to alter the engine efficiency threshold. As an example, for high states of charge of the battery system 16, the engine efficiency threshold may be increased. For example, for states of charge exceeding 65%, the engine efficiency threshold may be increased from 12 kw to 14 kw. As another example, for low states of charge of the battery system 16, the engine efficiency threshold may be decreased. For example, for states of charges less than 35%, the engine efficiency threshold may be decreased from 12 kw to 10 kw.

Figure 3A:
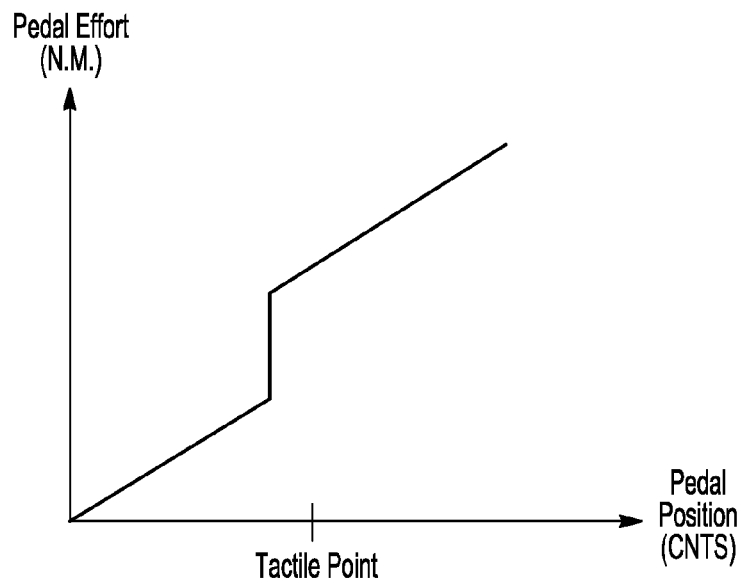
FIGS. 3A and 3B are exemplary plots of pedal effort versus pedal position in pedal open direction for the accelerator pedal of FIG. 1.
Figure 3B:
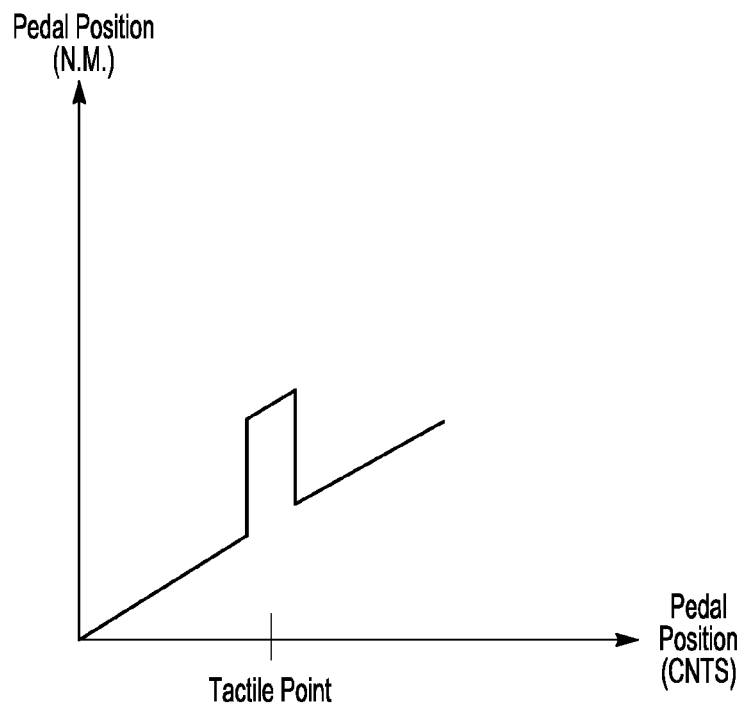

FIGS. 3A and 3B are exemplary plots of accelerator pedal force versus accelerator pedal position. FIG. 3A shows a step-up in pedal force at the tactile position. FIG. 3B shows a step-up and step-down in pedal force around the tactile position.

Figure 4:
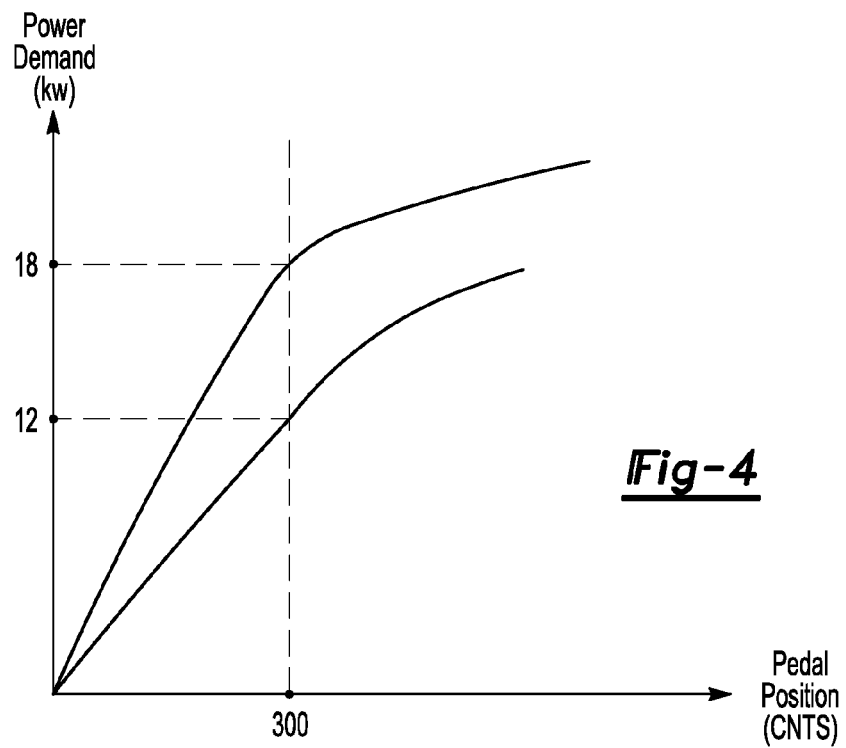
FIG. 4 is another exemplary plot of driver demanded power versus accelerator pedal position for the accelerator pedal of FIG. 1.

FIG. 4 is an exemplary plot of driver demanded power versus accelerator pedal position. The tactile position is a fixed point in the pedal travel. The tactile position, in this example, is fixed at 300 counts. The pedal mappings pass through the tactile position. If, for example, the engine system 14 will be started at driver demands for power above 12 kw, the pedal mapping will be curve fit such that a pedal position of 300 counts coincides with 12 kw of driver demanded power. If, for example, the engine system 14 will be started at driver demands for power above 18 kw, the pedal mapping will be curve fit such that a pedal position of 300 counts coincides with 18 kw of driver demanded power. The fixed tactile position may be removed, for example, on tip out.

VSC 12 may use linear interpolation, or other curve fitting techniques, to curve fit the pedal mapping. For example, the VSC 12 may use linear interpolation to define the pedal mapping between a minimum pedal position and the tactile position. VSC 12 may use an n-order polynomial to define the pedal mapping between the tactile position and a maximum pedal position.

Figure 5:
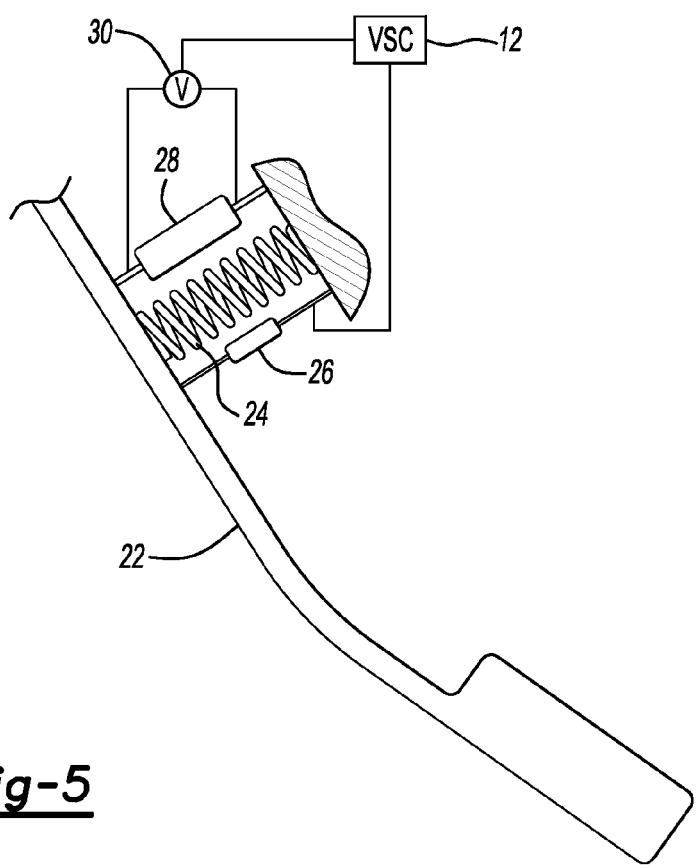
FIG. 5 is a schematic diagram, in cross-section, of the accelerator pedal and vehicle system controller of FIG. 1.

FIG. 5 is a schematic view, in cross section, of the accelerator pedal 22 of FIG. 1. Spring 24 assists in returning the accelerator pedal 22 to its nominal position. Position sensor 26 communicates the position of the accelerator pedal 22 to the VSC 12 via CAN. Force generator, e.g., a solenoid electric motor or other device capable of generating a resistance to motion, is electrically connected with a variable voltage source 30. As the voltage increases, the pedal effort increases. The VSC 12 communicates pedal effort commands, via a voltage, to the variable voltage source 30. These pedal effort commands control the variable voltage source 30 to achieve, for example, the pedal effort versus pedal position of FIGS. 3A or 3B.

Figure 6:
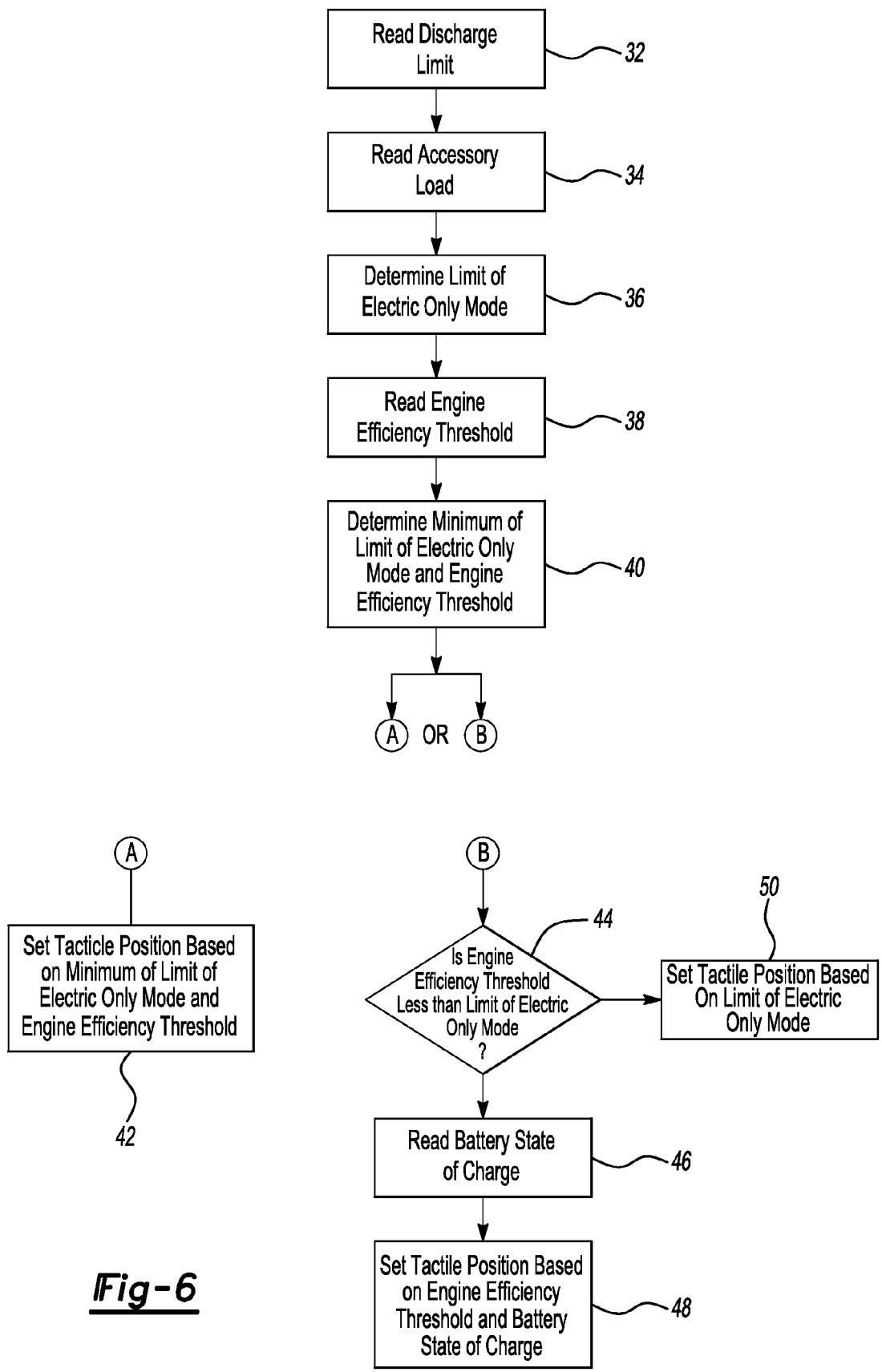
FIG. 6 is a flow chart of a strategy for setting an accelerator pedal tactile position in accordance with certain embodiments of the invention.

FIG. 6 is a flow chart of a strategy for setting the tactile position of an accelerator pedal. At block 32, a discharge limit of a battery is read. At block 34, an accessory load is read. At block 36, a limit of electric only mode is determined. At block 38, an engine efficiency threshold is read. At block 40, a minimum of the limit of electric only mode and the engine efficiency threshold is determined. At block 42, the tactile position is set based on the minimum determined at block 40. Alternatively, it is determined whether the engine efficiency threshold is less than the limit of the electric only mode at block 44. If yes, a state of charge of a battery is read at block 46. At block 48, the tactile position is set based on the engine efficiency threshold and the battery state of charge. If no, the tactile position is set based on the limit of electric only mode at block 50.

Figure 7:
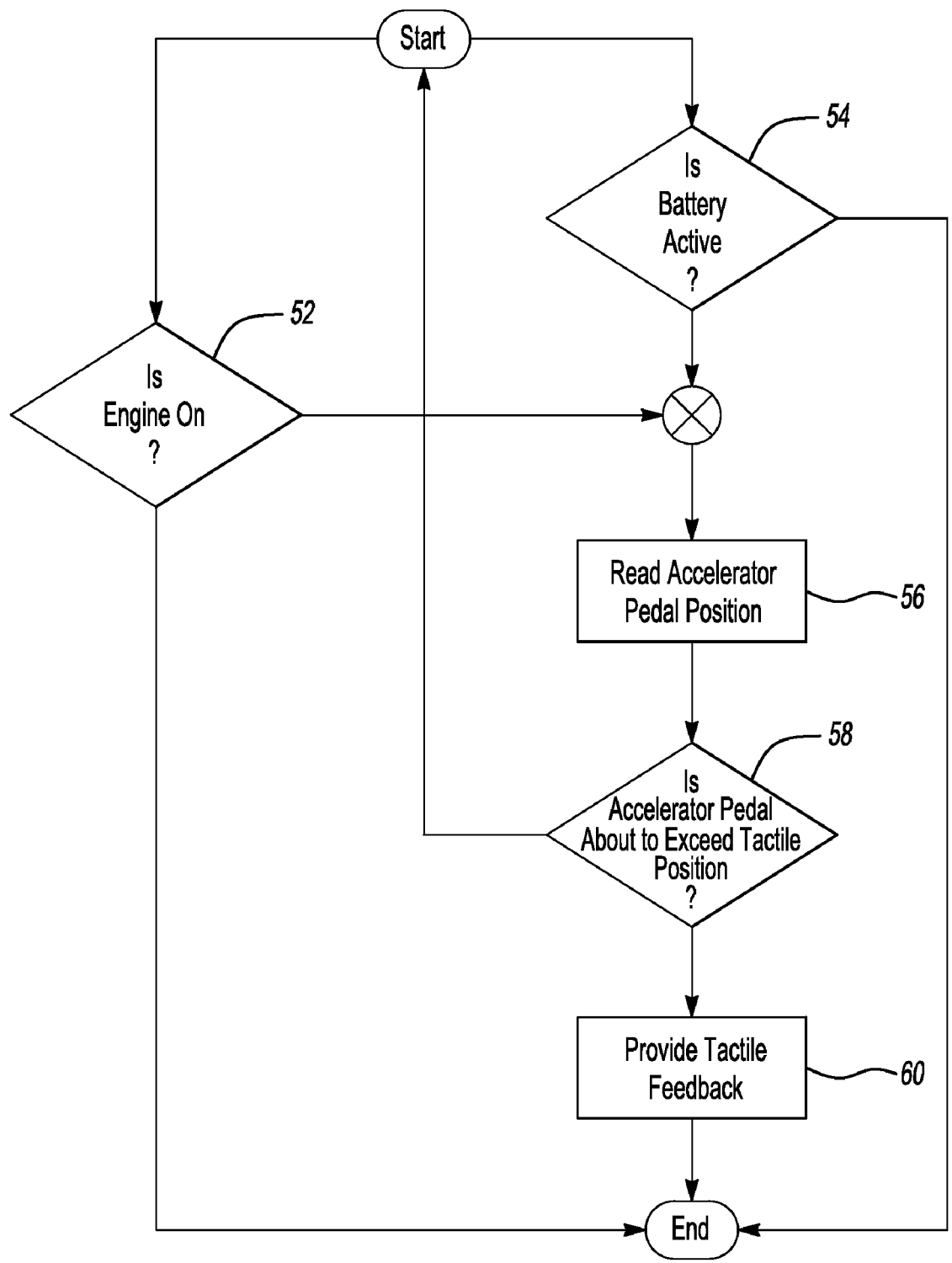
FIG. 7 is a flow chart of a strategy for alerting a driver that an engine is about to be started in accordance with certain embodiments of the invention.

FIG. 7 is a flow chart of a strategy for alerting a driver that an engine is about to be started. At block 54, it is determined whether an engine is on. If the engine is off, an accelerator pedal position is read at block 56. At block 58, it is determined whether the accelerator pedal is about to exceed a tactile position. If yes, tactile feedback is provided at block 60. If no, the strategy begins again. Referring to block 54, if the engine is on, the strategy ends.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for alerting a driver of a vehicle including a motive power source and an accelerator pedal having a threshold position beyond which the power source will activate comprising:

determining whether the power source is active; and providing tactile feedback to the driver via the pedal if the power source is inactive and the pedal is about to exceed the threshold position to alert the driver that the power source is about to activate.

2. The method of claim 1 wherein the accelerator pedal has a pedal effort and wherein the tactile feedback comprises an increase in pedal effort.

3. The method of claim 2 wherein the increase in pedal effort lasts through a predefined range of pedal positions.

4. The method of claim 1 wherein the threshold pedal position is fixed.

5. A method for alerting a driver of a vehicle including an accelerator pedal, a first motive power source and a second motive power source having an activation power threshold, that the second motive power source is about to be activated, the method comprising:

determining whether the second motive power source is active;

determining a motive power capacity of the first motive power source;

determining a threshold accelerator pedal position based on the motive power capacity and the activation power threshold; and providing feedback to the driver if the second motive power source is inactive and the accelerator pedal is about to exceed the threshold accelerator pedal position, thereby alerting the driver of the vehicle that the second motive power source is about to be activated.

6. The method of claim 5 wherein the feedback comprises tactile feedback.

7. The method of claim 6 wherein the accelerator pedal has a pedal effort and wherein the tactile feedback comprises an increase in pedal effort.

8. The method of claim 7 wherein the increase in pedal effort lasts through a predefined range of pedal positions.

9. The method of claim 5 wherein the second motive power source is activated if the accelerator pedal exceeds the threshold accelerator pedal position.

10. The method of claim 5 wherein the first motive power source comprises a battery and wherein the motive power capacity is based on a discharge power limit of the battery.

11. The method of claim 5 wherein the threshold accelerator pedal position is further based on a state of charge of the battery.

12. A system for alerting a driver of a vehicle including first and second motive power sources that the second motive power source is about to be activated, the system comprising:
   an accelerator pedal having a threshold pedal position beyond which the second motive power source will be activated; and
   at least one controller configured to
      determine whether the second motive power source is active, and
      provide tactile feedback via the accelerator pedal if the second motive power source is inactive and the accelerator pedal is about to exceed the threshold pedal position, thereby alerting the driver of the vehicle that the second motive power source is about to be activated.

13. The system of claim 12 wherein the at least one controller is further configured to determine a motive power capacity of the first motive power source and wherein the threshold pedal position is based on the motive power capacity.

14. The system of claim 13 wherein the first motive power source comprises a battery and wherein the motive power capacity is based on a discharge power limit of the battery.

15. The system of claim 12 wherein the second motive power source has an activation power threshold and wherein the threshold pedal position is based on the activation power threshold.

16. The system of claim 15 wherein the second motive power source comprises an engine.

17. The system of claim 12 wherein the first motive power source comprises a battery and wherein the threshold pedal position is based on a state of charge of the battery.

18. The system of claim 12 wherein the accelerator pedal has a pedal effort and wherein the tactile feedback comprises an increase in pedal effort.

19. The system of claim 18 wherein the increase in pedal effort lasts through a predefined range of pedal positions.

20. The system of claim 12 wherein the threshold pedal position is fixed.

* * * * *